Figure 1:
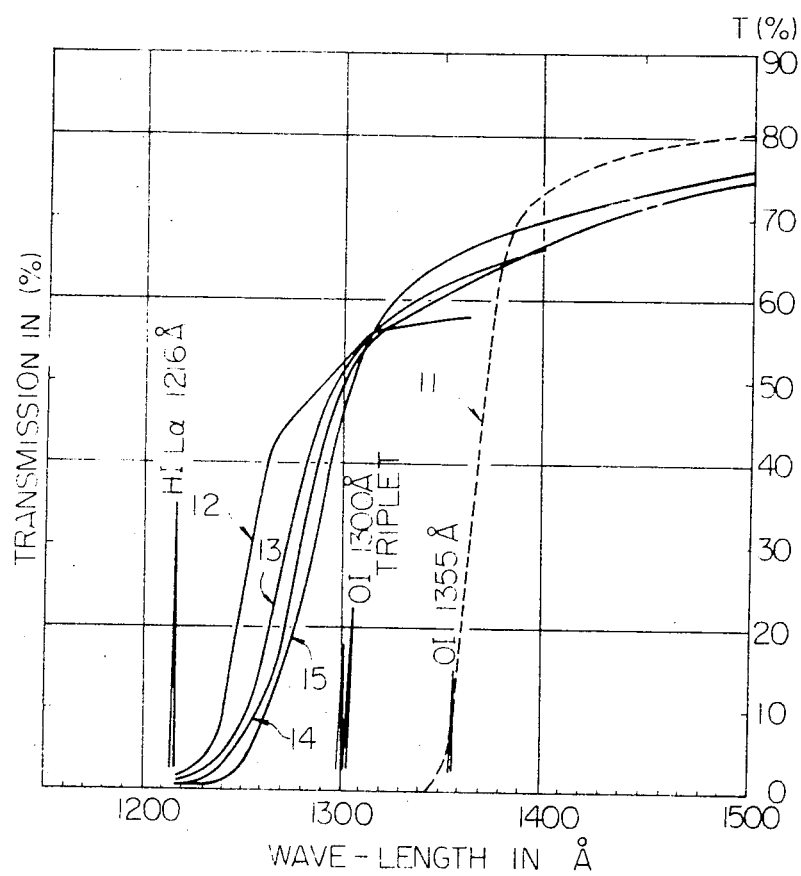

United States Patent
Tomiki et al.

[11] 3,744,870
[45] July 10, 1973

[54] OPTICAL FILTER COMPRISING A SUBSTRATE OF METAL FLUORIDE HAVING DEPOSITED THEREON A FILM OF STRONTIUM OR BARIUM FLUORIDE

[75] Inventors: Tetsuhiko Tomiki; Takeo Miyata, both of Kadoma, Osaka, Japan

[73] Assignee: Matsushita Electric Industrial Company Limited, Osaka, Japan

[22] Filed: May 28, 1971

[21] Appl. No.: 147,820

Related U.S. Application Data
[63] Continuation-in-part of Ser. No. 852,738, Aug. 25, 1969, abandoned.

[52] U.S. Cl. .................................................. 350/1
[51] Int. Cl. ............................................ G02b 5/22
[58] Field of Search ................... 350/1, 163–166; 117/33.3

[56] References Cited
OTHER PUBLICATIONS

Baumeister, P. W., "Notes on Multilayer Optical Filters"—Handbook of Optical Design (HDBK 140)—RCVD April 1964, pp. 20–15

Kandare et al.—"Optical Properties of Alkaline Earth-metal Fluorides in the Far Ultraviolet" Compt. Rend. Acad. Sc. Paris, Serie B—4/1966–pp. 1020–1023.

Gisin, "Optical Constants of Thin Strontium Fluoride Films"–Optics & Spectroscopy–August 1969–pp. 194–195.

Primary Examiner—Ronald L. Wibert
Assistant Examiner—Ronald J. Stern
Attorney—McCarthy, Depaoli, O'Brien and Price

[57] ABSTRACT

An optical filter for selectively transmitting the ultraviolet rays of a predetermined spectral range including 1,300 A. triplet of atomic oxygen, which filter comprises an about 2 mm thick substrate composed of a metal fluoride, such as $CaF_2$, LiF or $MgF_2$ and a thin film having a thickness of 420 to 1,000 A. deposited thereon and composed of $SrF_2$ or $BaF_2$. By fabricating the thin film in such extremely thin lamina form, it is possible to completely isolate the ultraviolet rays of the predetermined range from the Lyman alpha radiation of atomic hydrogen even when the filter is subject to relatively large changes in the ambient temperature.

3 Claims, 2 Drawing Figures

OPTICAL FILTER COMPRISING A SUBSTRATE OF METAL FLUORIDE HAVING DEPOSITED THEREON A FILM OF STRONTIUM OR BARIUM FLUORIDE

This application is a continuation-in-part of patent application Ser. No. 852,738 filed Aug. 25, 1969 now abandoned.

This invention relates to a laminated optical filter and more particularly to an optical filter and a process preparing the filter, which filter is capable of selectively transmitting the ultraviolet rays of a predetermined spectral range including 1,300 A. triplet of atomic oxygen while cutting off the Lyman alpha radiation of atomic hydrogen even when it is subject to relatively large changes in the ambient temperature.

Recent advance in the space science and technology, especially in space optics, has made it possible to investigate various phenomena in the field of space spectroscopy through the analysis of ultraviolet rays. An optical device provided with an optical filter is used for such analysis of ultraviolet rays. A high performance stability over a wide range of ambient temperature variation is required of the optical filter used for this purpose.

Some optical filters using a single plate made of crystals of calcium fluoride or strontium fluoride have thus far been proposed and demonstrated. The plate is approximately 2 millimeters thick to provide a sufficient mechanical strength.

The optical filter made of calcium fluoride has a 1,220 A. short wavelength at room temperature so that it cuts off the Lyman alpha radiation at that temperature. However, this optical filter has the disadvantage that it cannot cut off the Lyman alpha radiation completely if the ambient temperature decreases more than 10° from the room temperature. This is because the shorter wavelength absorption edge shifts considerably to the shorter wavelength side as the temperature decreases.

The optical filter made of strontium fluoride, on the other hand, shows a sharp increase in absorption around 1,305 A. and absorbs substantially the rays of wavelength shorter than 1,280 A. at room temperature. However, in the case where the temperature increases more than 10° from the room temperature, the absorption edge shifts toward the longer wavelength side so that it partially cuts off the 1,300 A. triplet emission spectra of atomic oxygen as well.

It is, therefore, a primary object of this invention to provide an optical filter capable of selectively transmitting the ultraviolet rays of a predetermined range including 1,300 A triplet while cutting off the Lyman alpha radiation of atomic hydrogen.

It is another object of this invention to provide an optical filter which is stable in performance over a relatively wide range of the ambient temperature variation.

Figure 2:
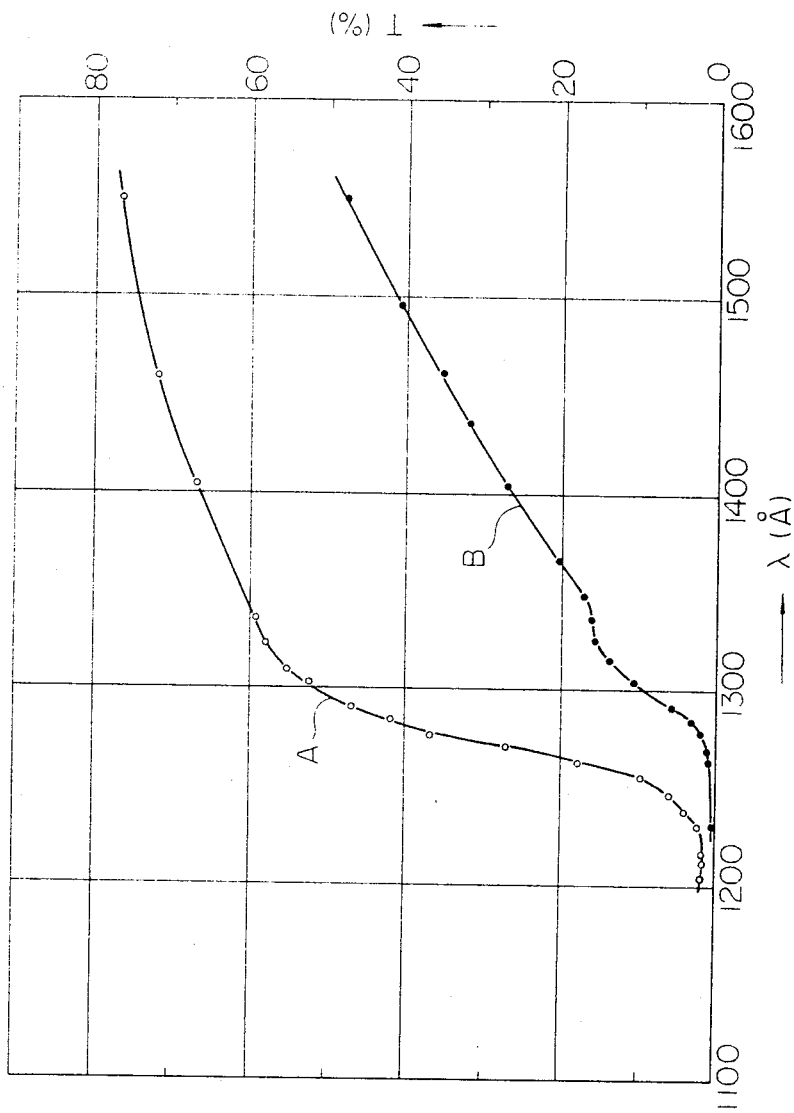

In the drawing:

FIG. 1 is a graph showing the percent transmittivity of a filter of the present invention constituted by a 2 mm-thick substrate and a 460 ± 40 A. thick thin film plotted against wavelength in angstrom; and FIG. 2 is a graph showing the percent transmittivities of other filters according to this invention constituted.

This invention is based on the discovery that the reduction in the thickness of the strontium or barium fluoride plate shifts the absorption edge toward the shorter wavelength side and renders the absorption characteristics substantially temperature-independent. In FIG. 1, the broken line 11 represents the transmission characteristics of a single-plate barium fluoride filter measured at room temperature, said filter having a thickness of 2 mm. The solid lines 12 to 15 stand for those of an optical filter according to this invention measured at temperatures of 78°, 234°, 299° and 373 °K, respectively. The present optical filter comprises a substrate composed of calcium fluoride having a thickness of 0.5 to 5 mm and an extremely thin barium fluoride film deposited thereon. The thickness of the film is of from 420 to 500 angstroms. The comparison of these characteristic curves will reveal that when the alkaline earth metal fluoride film is made thinner to such thickness, the absorption edge is shifted toward the shorter wavelength side of the barium fluoride filter about 100 angstroms and the shifting range of the absorption edge occurring when the temperature varies over 300° is limited within only 40 angstroms. Thus it will be accepted that transmittivity of the present optical filter is substantially temperature-independent.

As will be readily observed from FIG. 1, the absorption edges of the present optical filter are confined between the spectra of the Lyman alpha radiation of atomic hydrogen and the 1,300 A. triplet radiations of atomic oxygen. On the other hand, it is also observed that the transmittivity at about 1,300 A. of this filter is about 53 to 47 percent in spite of such a great variation of the ambient temperature as from 78° to 373 °K. This is caused by the thickness of about 460 A. of the thin film. This results in that even if the ambient temperature is varied as such, the intensity of the 1,300 A. triplet radiations which is passed through the filter may so minutely change that detection of the radiations is much achieved. Thus, this optical filter can favorably transmit the latter radiations while cutting off the former radiation over a relatively wide range of temperature variation.

The substrate to be used is a plate made of one of the metal fluorides including $CaF_2$, LiF and $MgF_2$ and having a thickness of about 0.5 mm to 5 mm. The substrate so formed is substantially transparent to at least the ultraviolet rays of 1,300 A. triplet of atomic oxygen.

On the substrate is deposited a thin film composed of strontium fluoride or barium fluoride by vacuum deposition. The thickness of the film to be deposited on the substrate is, as previously described, of the order of several hundreds angstroms.

The optical filter according to this invention will find the best application where it is employed in conjunction with an NO gas-filled ion chamber to measure a day or night glow of the ultraviolet region in the upper atmosphere.

Above-mentioned favorable characteristics of this filter substantially depends on such thickness of the thin film.

Therefore, allowable minimum and maximum thickness of the particular thin film should be determined though the optimum thickness of the thin film is 460 A. We assume the ambient temperature to vary from 200 °K to 400 °K in consideration of practical condition. Furthermore, for a certain detection, the transmittivity at $L_\alpha$ and 1,300 A. triplet of the filter should be smaller than 2 percent and larger than 10 percent, respectively.

In consideration of above conditions, the minimum thickness will first theoretically be discussed hereinbelow.

As the thickness of the thin film reduces and the ambient temperature decreases, its transmittivity at $L_\alpha$ increases, so that the minimum thickness is determined by discussing the transmittivity at $L_\alpha$ when an ambient temperature is 200 °K. When light radiation with intensity $I_o$ is irradiated onto a $d$ cm thick thin film having an index of reflection $R$ and absorption coefficient $k$, intensity $I$ of the transmitted through the thin film is given by $$I = (1-R)T_o e^{-kd} \quad (1)$$

Then $$d = 2.3/k \log_{10} (1-R)/T \quad (2)$$

where $T$ = transmittivity = $I/I_o$

When the ambient temperature is 200 °K, the index of reflection $R$ at $L_\alpha$ of $BaF_2$ thin film is known to be about 15 percent. On the other hand, the absorption coefficient $K$ at $L_\alpha$ is measured to be $8 \times 10^5$ cm$^{-1}$ at 200 °K. In addition, the transmittivity of the $CaF_2$ substrate is about 65 percent. Assuming $T = 3$ percent and using these values, the thickness $d$ is obtained from equation (2) as follows:

$d = 2.3/8 \times 10^5 \cdot \log 0.85/0.03$
$\cong 420$ A.

In this instance, the transmittivity at $L_\alpha$ of the substrate composed of $CaF_2$ single crystal of a thickness of 2 mm is about 65 percent, and then the total transmittivity of the filter constituted by the 2 mm thick substrate and 420 A. thick thin film is $0.65 \times 0.03 = 0.195 \cong 2$ percent. As a result, it becomes apparent the minimum thickness of the thin film is 420 A.

Since the equation (1) is insufficient to express the transmission of the radiation having a wavelength in the vicinity of 1,300 A, and therefore referring to FIG. 2, the maximum thickness is to be discussed hereinbelow. Curve A represents the practically measured transmission characteristics of the 420 A. thick $BaF_2$ thin film on $CaF_2$ substrate at 200 °K and curve B represents that of a 1,000 A. thick $BaF_2$ thin film on $CaF_2$ substrate at 400 °K. As seen from the curve B, the transmittivity of the filter at 1,300 A. is about 10 percent when the ambient temperature is 400 °K. Therefore, the maximum thickness of the thin film is 1,000 A.

It should be noted that as seen from the curve A the practically measured transmittivity and the theoretically calculated one are substantially accord to each other at $L_\alpha$.

The filter of this invention is prepared first selecting a suitable substrate. First requirement for the substrate is that it should be so pure as to substantially transmit vacuum-ultraviolet rays therethrough. Second requirement is that the same should have a clover surface physically so clean as to be suitable for deposition of the thin film thereon. It should be noted that an optically polished surface may be unusable in this case.

The substrate is to be clover preferably in vacuum and when otherwise clover in air thereafter it should be heated at about 500°C for a few minutes in vacuum. The thus suitably clover substrate is positioned on a glassy carbon plate preheated and positioned in a vacuum of $1 \times 10^{-6}$ torr established within a hermetically sealed housing such as a bell jar. A particle of material for the thin film is positioned within a platinum helical coil connected to an electric source which coil is disposed in the same housing as the glassy carbon plate but separated therefrom by a shutter. The glassy carbon plate is heated at about 500°C for 100 seconds and thereafter cooled for 10 minutes. Then, the particle is heated by flowing a current through the helical coil a current of about 7 A. for 100 seconds and thereafter the shutter is fully opened for 31 seconds as to deposit the evaporated material for thin film onto the substrate.

A preferred example for preparing the particular optical filter is described below.

EXAMPLE

A clover $CaF_2$ substrate having 11 mm diameter and 1 mm thickness is prepared. A glassy carbon plate placed on a heating coil and a platinum helical coil consisting of seven turns of 0.5 mm platinum wire, 5 mm in diameter and pitched six turns to the centimeter are suitably placed within a bell jar which is evacuated to $1 \times 10^{-6}$ torr. The heating coil and the helical coil are respectively connected to an electric source. A shutter is provided for shielding substrate to be placed on the glassy carbon plate. While the shutter is closed, the glassy carbon plate is heated by flowing a current of 10 A. through the heating coil for a few minutes and at the same time the platinum coil was heated by flowing a current 8 A. therethrough. Thereafter, a 30 mg. $BaF_2$ particle $1 \times 1 \times 4$ mm in size was placed within the platinum coil and simultaneously the $CaF_2$ substrate is placed on the glassy carbon. While the shutter was closed, the substrate was heated for 100 seconds by a current 7 A. through the heating coil and, thereafter, was left in the vacuum for 10 minutes. Then, the $BaF_2$ particle was heated by flowing a current of 7 A. through the helical coil and after 100 seconds the shutter was fully opened for 31 seconds. In this instance, the vacuum within the jar was $1 \times 10^{-5}$ torr. Tereafter, the current through the helical coil was stopped and the shutter was simultaneously closed. After 20 minutes from the closure of the shutter, the substrate on which the $BaF_2$ thin layer was formed was taken out of the jar.

It is now apparent that the filter of this invention has excellent properties. Firstly, its transmittivity at $L_\alpha$ is smaller than 2 percent and, on the other hand, at 1,300 A. greater than 10 percent at an ambient temperature of from 200° to 400 °K. Secondly, the transmittivity at 1,300 A. the filter having a $460 \pm 40$ A. changes so minutely as 6 percent in spite of great variation of the ambient temperature.

The filter of this invention will therefore find the best application where it is employed in conjunction with an NO gas-filled ion chamber to measure a day-night-glow of the ultraviolet region in the upper atmosphere.

What is claimed is:

1. An optical filter for selectively transmitting ultraviolet rays of a predetermined spectral range including 1,300 A. triplet of atomic oxygen, which filter comprises a substrate composed of metal fluoride selected from the group consisting of calcium fluoride, lithium fluoride and magnesium fluoride, said substrate being substantially transparent to at least the ultraviolet rays of said spectral range, and a thin film deposited on said substrate and composed of alkaline earth metal fluoride selected from the group consisting of strontium fluoride and barium fluoride, said thin film having a thickness from 420 A. to 1,000 A.

2. An optical filter according to claim 1, wherein said thin film has a thickness of from 420 to 500 A.

3. The method of claim 2 wherein the substrate has a thickness of 0.5 to 5 mm.